United States Patent [19]

Kanekawa et al.

[11] Patent Number: 5,084,878
[45] Date of Patent: Jan. 28, 1992

[54] FAULT TOLERANT SYSTEM EMPLOYING MAJORITY VOTING

[75] Inventors: Nobuyasu Kanekawa, Hitachi; Hirokazu Ihara, Machida; Hatsuhiko Kato, Yokohama, all of Japan

[73] Assignee: Hitachi, Ltd., Tokyo, Japan

[21] Appl. No.: 420,473

[22] Filed: Oct. 12, 1989

[30] Foreign Application Priority Data

Oct. 24, 1988 [JP] Japan .................................. 63-266055
Mar. 15, 1989 [JP] Japan .................................. 1-60993

[51] Int. Cl.$^5$ ............................................ G06F 11/18
[52] U.S. Cl. .......................................... 371/36; 371/68.1
[58] Field of Search ................... 371/36, 68; 364/269.1

[56] References Cited

U.S. PATENT DOCUMENTS

| | | | |
|---|---|---|---|
| 3,783,250 | 1/1974 | Fletcher et al. | 235/153 AF |
| 3,859,513 | 1/1975 | Chuang et al. | 235/153 AE |
| 4,517,673 | 5/1985 | Brown et al. | 371/36 |
| 4,583,224 | 4/1986 | Ishii et al. | 371/36 |
| 4,667,284 | 5/1987 | Asami | 364/187 |

OTHER PUBLICATIONS

Losq, Jacques, "A Highly Efficient Redundancy Scheme: Self-Purging Redundancy", IEEE Transactions on Computers, vol. C-25, No. 6, Jun. 1976.

*Primary Examiner*—Jerry Smith
*Assistant Examiner*—Russell E. Cass
*Attorney, Agent, or Firm*—Antonelli, Terry & Stout

[57] ABSTRACT

Input signals supplied to a plurality redundant subsystems are input to an output selecting circuit after an output of a subsystem is changed from an output signal of a subsystem having a most reliable output signal to another output signal of another subsystem having a lower reliable output signal in turn using self-diagnoses and cross-diagnoses in each subsystem according to an algorithm as follows:

if any subsystem has Syndrome 1 then select the subsystem(s) which has Syndrome 1, else if any subsystem has Syndrome 2 then select the subsystem(s) which has Syndrome 2;

else if any subsystem has Syndrome L-1 then select the subsystem(s) which has Syndrome L-1;

else output fail safe signal.

The output selecting circuit outputs a selected signal by a method of majority voting based on the output signals from the subsystems.

7 Claims, 11 Drawing Sheets

```
# DEFINE NONE 0
EXTERN UNSIGNED INT GOOD;

DIAGNOSIS(CHECK, AGREE, LEVEL)
  UNSIGNED INT CHECK, AGREE, LEVEL;
{
  IF(AGREE & CHECK)
     GOOD=AGREE & CHECK;
  ELSE IF(AGREE)
     GOOD=AGREE;
  ELSE IF(CHECK)
     GOOD=CHECK;
  ELSE
     GOOD=NONE;
}
```

FIG. 13

FAULT TOLERANT SYSTEM EMPLOYING MAJORITY VOTING

FIELD OF THE INVENTION

The present invention relates to a fault tolerant system employing a majority voting, and more particularly to a method for cross-diagnosing subsystems well suited to render a system redundancy.

BACKGROUND OF THE INVENTION

In recent years, computers have come to play increasingly more important roles. In consequence, the reliability of the computers have come to be eagerly requested. As the causes of malfunctions which spoil the reliability of the computers, there are mentioned permanent failure of hardware, bugs in software, transient data errors ascribable to electrical noise and the irradiation of radiation, etc.

For heightening the reliability of a system, there is employed a method wherein subsystems constituting the system are made redundant and multiplied. Regarding methods of handling the outputs of the multiplexed subsystems, "A Highly Efficient Redundancy Scheme: Self-Purging Redundancy", IEEE Transactions on Computers, Vol. C-25, No. 6, June 1976, written by Mr. Jacques Losq, states in FIGS. 2 and 3 and its explanation on page 570 a method of making decisions by majority voter and a method of changing-over outputs on the basis of the cross-diagnostic results of the subsystems.

Referring to the prior art, the outputs of redundant subsystems are input to an elementary switch. In the elementary switch, only the input signals which coincide with the output signal of the majority voter is output to the voter. The voter produces the system output by majority voting of the output signals of the elementary switch. In the prior art mentioned above, the method based on the decision of majority voting has had a drawback that the majority voter can not output a normal signal unless two or more subsystems or modules are normal as disclosed in paragraph one on the right column on page 570 thereof. Namely, when a breakdown occurred in the redundant subsystems and the number of normal subsystems is reduced to one, the system is never operated normally.

SUMMARY OF THE INVENTION

An object of the present invention is to provide a fault tolerant system which is able to select and output a normal signal whenever there is at least one normal subsystem.

Definition of Terms

The definitions of terms for use in this specification will be indicated below:

Reliability of Output Signal (Reliability of Output): Probability at which an output signal is correct. It is expressed as a function of a syndrome observed within a system.

Cross-diagnostic Result: Result of a diagnosis made among a plurality of redundant subsystems. It is determined by a self-diagnostic result and inter-subsystem data comparison result, i.e. the agreement/disagreement of the output data. A cross-diagnostic result expresses the normality/abnormality of each subsystem which is an object to-be-diagnosed. The present invention consists principally in providing a means of a cross-diagnosis.

The cross-diagnosis is determined by respective subsystems. That is, different results are sometimes produced, by different subsystems which are diagnostic subjects.

A cross-diagnostic result 4-i (i: natural numbers from 1 to N) indicates the cross-diagnostic result determined in the subsystem 1-i. That is, i denotes the No. of a subsystem which is a diagnostic subject.

Decided Result: It is determined, judging from the cross-diagnostic results 4-1-4-N collectively. Which subsystem output is to be selected is determined by the decided result. A decided result S-i indicates information on whether a subsystem 1-i is normal or abnormal, where i denotes the No. of a subsystem which is an object to be decided.

In order to accomplish the above object, the present invention adopts means as follows:

1. A subsystem which has been diagnosed as being normal in consequence of a self-diagnosis and the processed result of which agrees with that of another subsystem is regarded as being normal, and the output thereof is delivered as a final output.

2. In the absence of a subsystem which satisfies the condition of step 1, a subsystem providing a processed result which agrees with that of another subsystem is regarded as being normal, and the output thereof is delivered as a final output.

3. In the absence of a subsystem which satisfies the condition of step 2, a subsystem which has been diagnosed normal in consequence of a self-diagnosis is regarded as being normal, and the output thereof is delivered as a final output.

4. In the absence of the subsystem which satisfies the condition of step 3, the delivery of an output is suspended, or a signal for giving a warning that no normal output is available is delivered.

Let $Pd\epsilon$ denote a defective report rate (the probability at which a subsystem is erroneously determined to be normal in spite of being abnormal) of self-diagnoses, $Pa\epsilon$ denote a probability at which erroneous data items agree, and $P\epsilon$ denote a probability at which an error occurs.

Assuming that the erroneous data items occur at random, a probability that they agree is considered a probability that two random data items agree and is expressed as:

$$Pa\epsilon = 2 - n \qquad (1)$$

where n: bit length of the data. Since the bit length n of the data usually has a large value, $$Pa\epsilon \approx 0 \qquad (2)$$

holds, and the following is considered to be true:

$$Pa\epsilon << Pd\epsilon \qquad (3)$$

Considering the above, the reliabilities Rd of the outputs in the respective cases 1, 2 and 3 become:

$$1: Rd = 1 - P_\epsilon^K \cdot Pd\epsilon^K \cdot Pa\epsilon^{K-1} \qquad (4)$$

$$2: Rd = (1 - P_\epsilon^K \cdot Pa\epsilon^{K-1}) \qquad (5)$$

$$3: Rd = (1 - P_\epsilon^K \cdot Pd\epsilon^K) \qquad (6)$$

where k: number of the subsystems determined to be normal.

Using the means, the outputs whose reliabilities are decreasingly lower in the order of the cases 1, 2 and 3 are successively selected. That is, the output of the highest reliability in the redundant subsystems is selected.

DETAILED DESCRIPTION OF THE PREFERRED EMBODIMENTS

Figure 1:
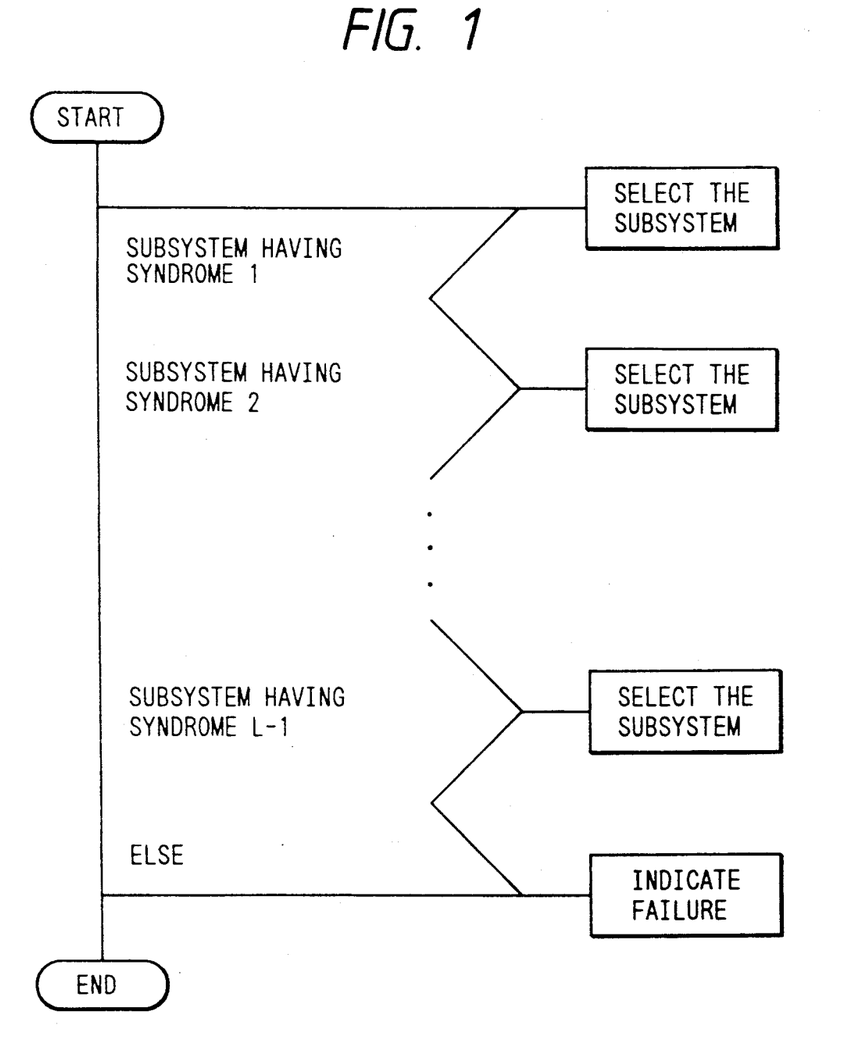
FIG. 1 shows a first embodiment of the present invention.

FIG. 1 shows a basic embodiment of the present invention. By adopting an algorithm as shown in FIG. 1, a subsystem having a highest reliability Rd can be selected.

Figure 10:
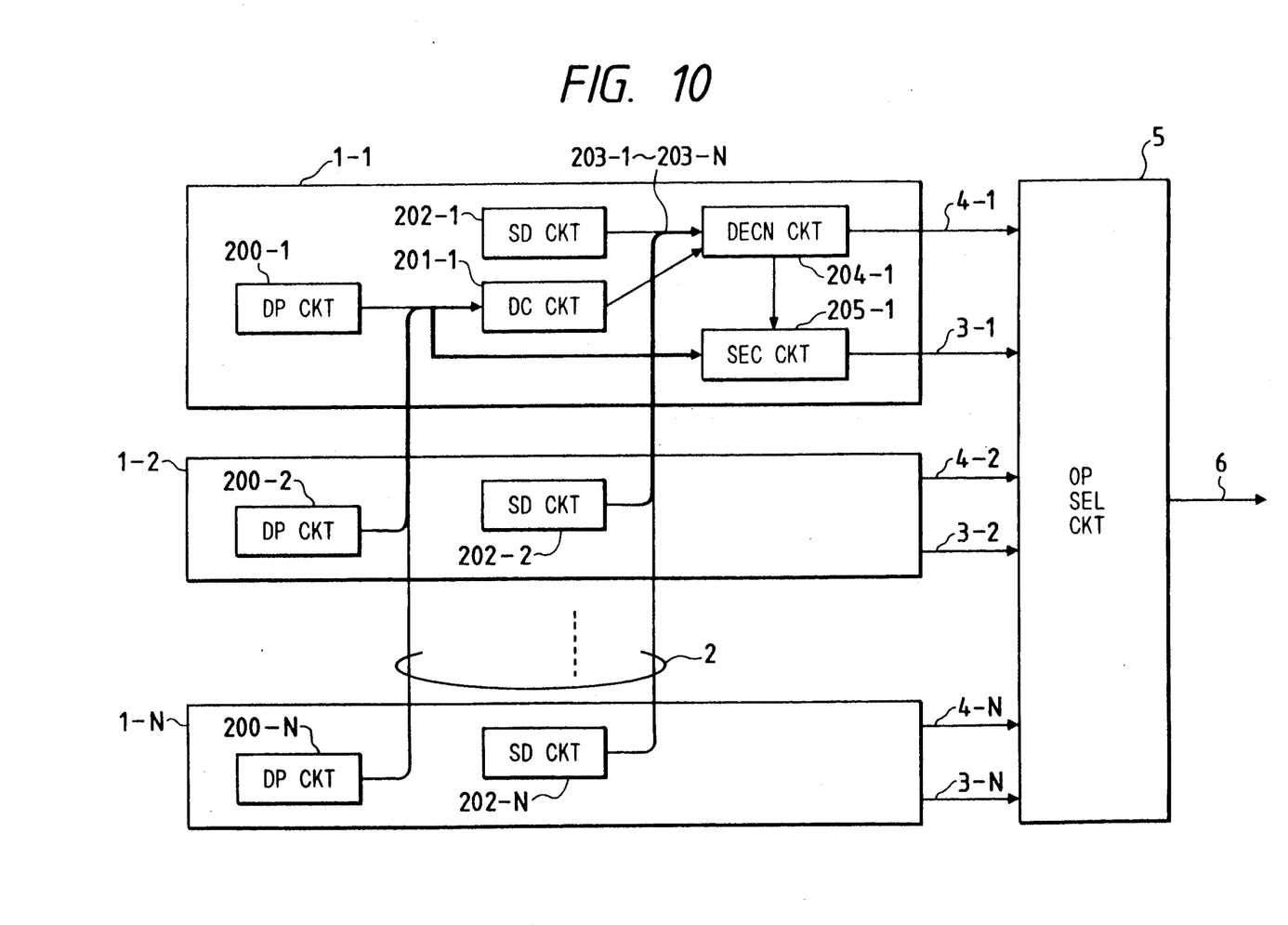
FIG. 10 shows a diagram for explaining procedures of self-diagnosis and cross-diagnosis in each subsystem.

As shown by the formulae (4), (5) and (6), the reliability Rd of the output can be indicated by the results of the self-diagnosis and data comparison between subsystems shown in FIG. 10, namely, between a syndrome of each subsystem.

Referring to FIG. 1, the syndromes 1, 2, - - - L are indicated in the order of a high degree syndrome to a low degree syndrome as follows:

$$Rd \text{ (Syndrome 1)} > Rd \text{ (Syndrome 2)} > \cdots > Rd \text{ (Syndrome L)} \quad (7)$$

The syndrome 1 denotes the best condition in which abnormality is not detected at all. The syndrome L denotes the worst condition in which abnormality is detected in all check items. For instance, when the check items comprise self-diagnosis and data comparison, the syndrome 1 denotes that abnormality is not detected in the self-diagnosis and the data of the subsystems are the same and the syndrome L denotes that abnormality is detected by the self-diagnosis and the data of the subsystems are not the same.

According to the algorithm shown by FIG. 1, a subsystem having a highest degree reliability Rd can be selected among many subsystems by advancing in turn from the highest degree syndrome to lower degree syndrome as follows:

if any subsystem has Syndrome 1
   then select the subsystem(s) which has Syndrome 1,
else if any subsystem has Syndrome 2
   then select the subsystem(s) which has Syndrome 2,
else if any subsystem has Syndrome L-1,
   then select the subsystem(s) which has Syndrome L-1,
else output fail safe signal.

Figure 2:
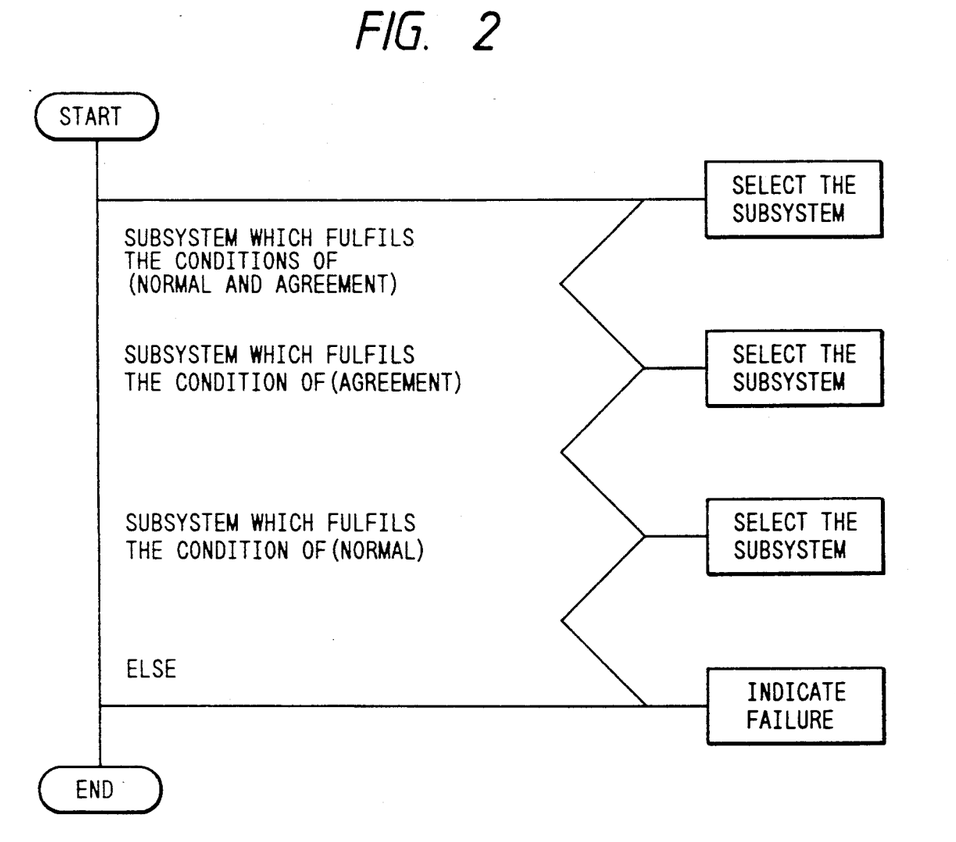
FIG. 2 shows a second embodiment of the present invention.

FIG. 2 shows another fundamental embodiment of the present invention, which is an algorithm for selecting the output of a subsystem with the highest reliability in a case where the following holds:

$$P_{ae} < P_{de}$$

Incidentally, in the drawings, "normal" expresses an event in which the pertinent subsystem has been determined to be normal in consequence of a self-diagnosis, and "agree" expresses that another subsystem provides a processed result which agrees with that of the pertinent subsystem.

Method of Self-diagnosis

In the case of a computer system by way of example, methods using the following have hitherto been proposed for self-diagnosis, and any of them may be employed:

1. Information signifying that a bit error has been corrected or detected by an ECC (Error Correcting Code) encoder/decoder added to a RAM;

2. Results detected by an error detecting function in a microprocessor (such as a bus error and an address error);

3. Executed result of a function diagnosing program for hardware;

4. Checked result of distributedly arranged data items where important data is prepared as the multiplexed items even in an identical subsystem beforehand, and when disagreement has been detected by checking the data items, the data is corrected according to decision by majority;

5. Error detection result by an error detecting function added to an arithmetic unit or the like; and so on.

Grades of Self-diagnostic Result

Figure 3:
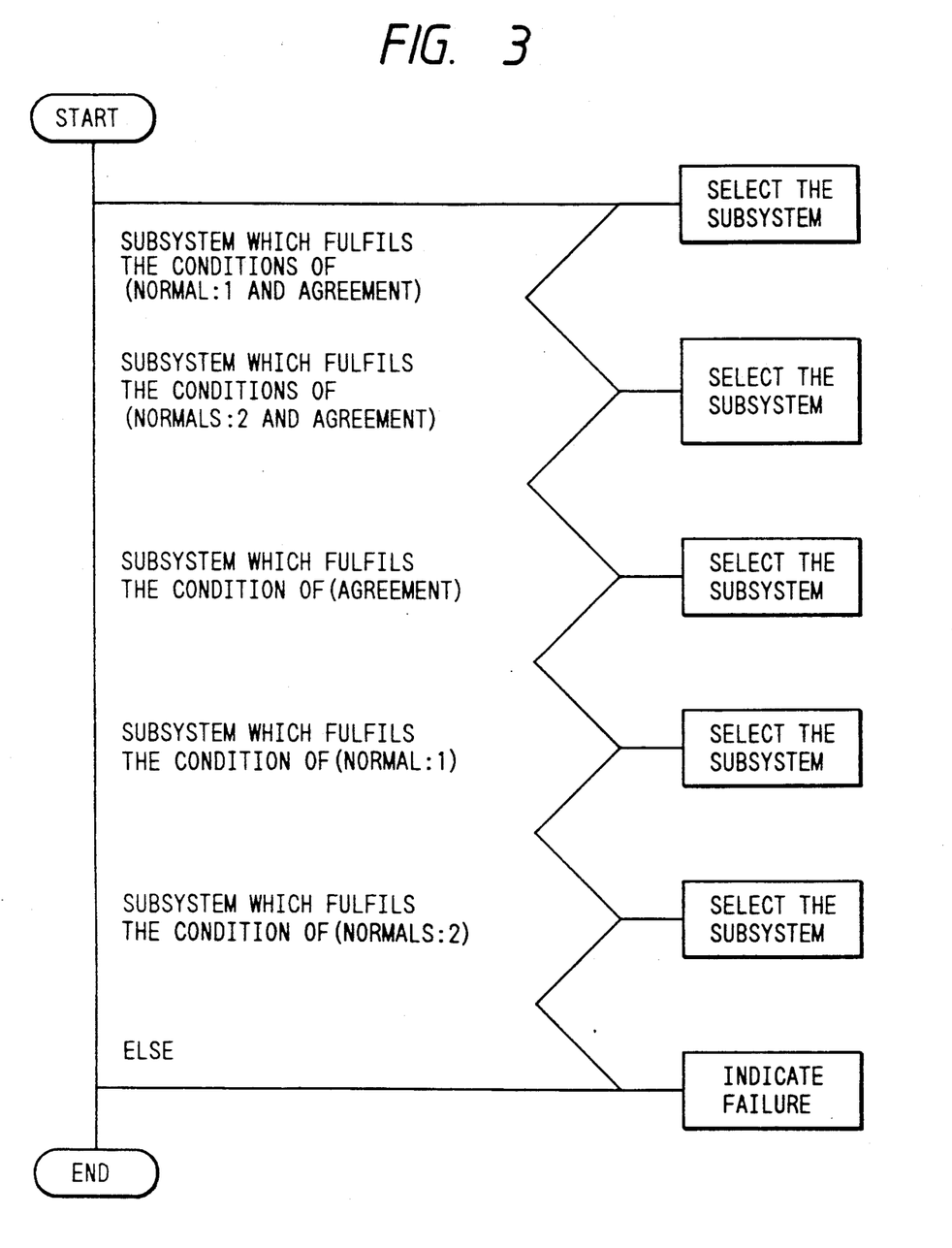
FIG. 3 shows a third embodiment of the present invention in the case where the result of a self-diagnosis is in two stages.

FIG. 3 shows the embodiment in the case where the result of a self-diagnosis has several stages (two stages in the case of this embodiment). For example, when the information of the aforementioned case 1 signifying that the bit error has been corrected or detected by an ECC is used as the result of the self-diagnosis, information items in two stages of 1-bit error correction and 2-bit error detection are obtained as the result.

With the ECC based on a conventional SEC-DEC (Single Error Correction Double Error Detection) code, when an error of three or more bits has occurred, it is detected as a 1-bit or 2-bit error. In addition, the error of three or more bits sometimes fails to be detected though with a very low possibility. Accordingly, even in a case where a correctable 1-bit error has been detected or where no error has been detected, an error of three or more bits might have occurred.

Letting "Normal 1" express an event that the bit error is not involved, and "Normal 2" express an event that an error of 2 or more bits is not involved, and letting defective report rates on the respective occasions be Pd$\epsilon$1 and Pd$\epsilon$2, the following relationship holds:

$$Pa_\epsilon < Pd_\epsilon 1 < Pd_\epsilon 2 \quad (8)$$

The outputs of the subsystems whose output reliabilities are as follows can be successively selected by this embodiment:

$$Rd = (1 - P_\epsilon^K \cdot P_{d\epsilon 1}^K \cdot P_{a\epsilon}^{K-1}) \quad (9)$$

$$Rd = (1 - P_\epsilon^K \cdot P_{d\epsilon 2}^K \cdot P_{a\epsilon}^{K-1}) \quad (10)$$

$$Rd = (1 - P_\epsilon^K \cdot P_{a\epsilon}^{K-1}) \quad (11)$$

$$Rd = (1 - P_\epsilon^K \cdot P_{d\epsilon 1}^K) \quad (12)$$

$$Rd = (1 - P_\epsilon^K \cdot P_{d\epsilon 2}^K) \quad (13)$$

Figure 4:
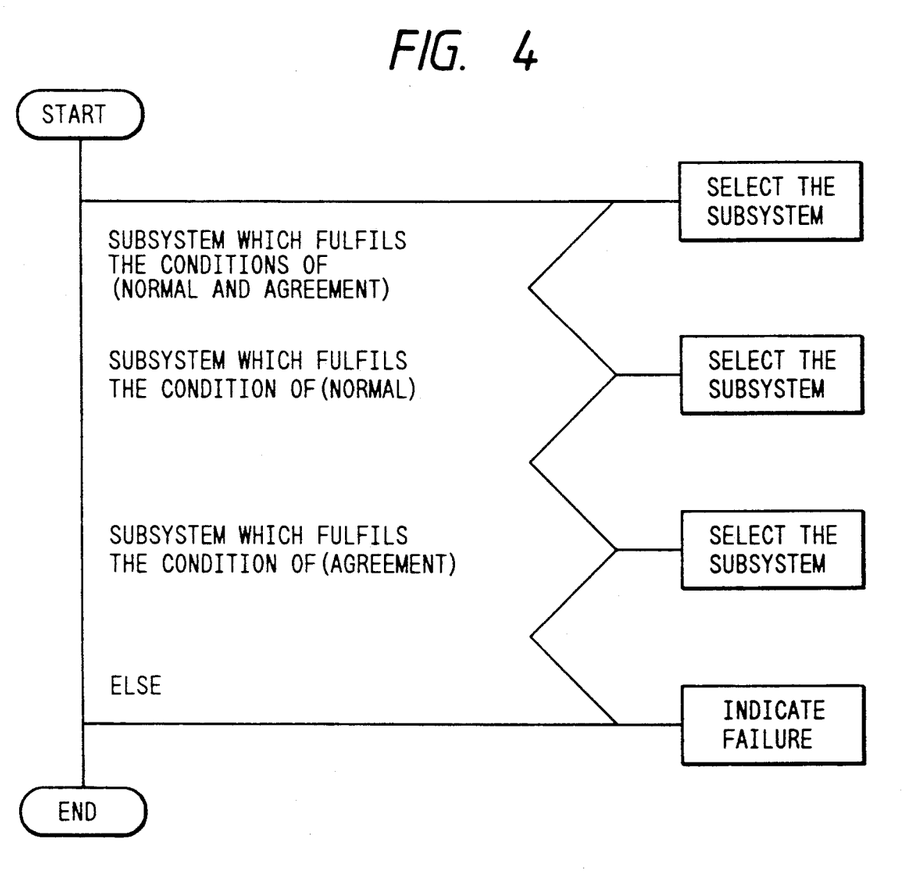
FIG. 4 shows a fourth embodiment of the present invention in the case where the self-diagnostic result is lower in a defective report rate than the checked result of data.

Besides, in a case where the defective report rate of the self-diagnostic result is very low and where $$Pa_\epsilon >> Pd_\epsilon 1 \quad (14)$$

holds, an output may be selected according to an algorithm shown in FIG. 4.

Setting of Reliability Level of Output

Figure 5:
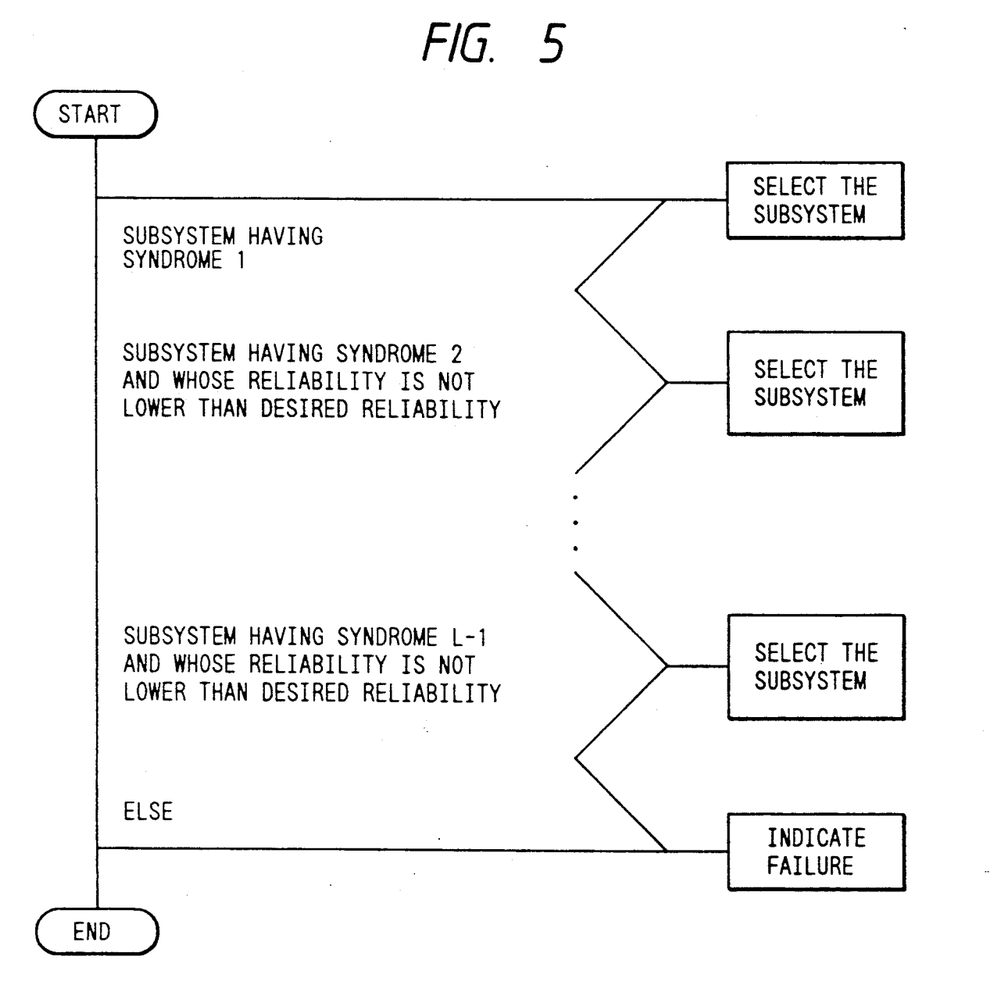
FIG. 5 is a fifth embodiment of the present invention showing a modified embodiment of FIG. 1 which is added thereto a judgment whether a reliability of the output of the system is higher than a desired value.

Referring to FIG. 5, the grade of the syndrome is lowered in the order of the Syndrome 1 to the Syndrome L-1. When there is a subsystem whose reliability is higher than a desired value, the output of the subsystem is selected. When there is no subsystem which fulfills the above-mentioned condition, a fail safe signal is output.

According to the embodiment shown in FIG. 5, it is prevented that the subsystem having the reliability less than the desired value does not output its signal so that the operation of the subsystem can be secured safely.

Figure 6:
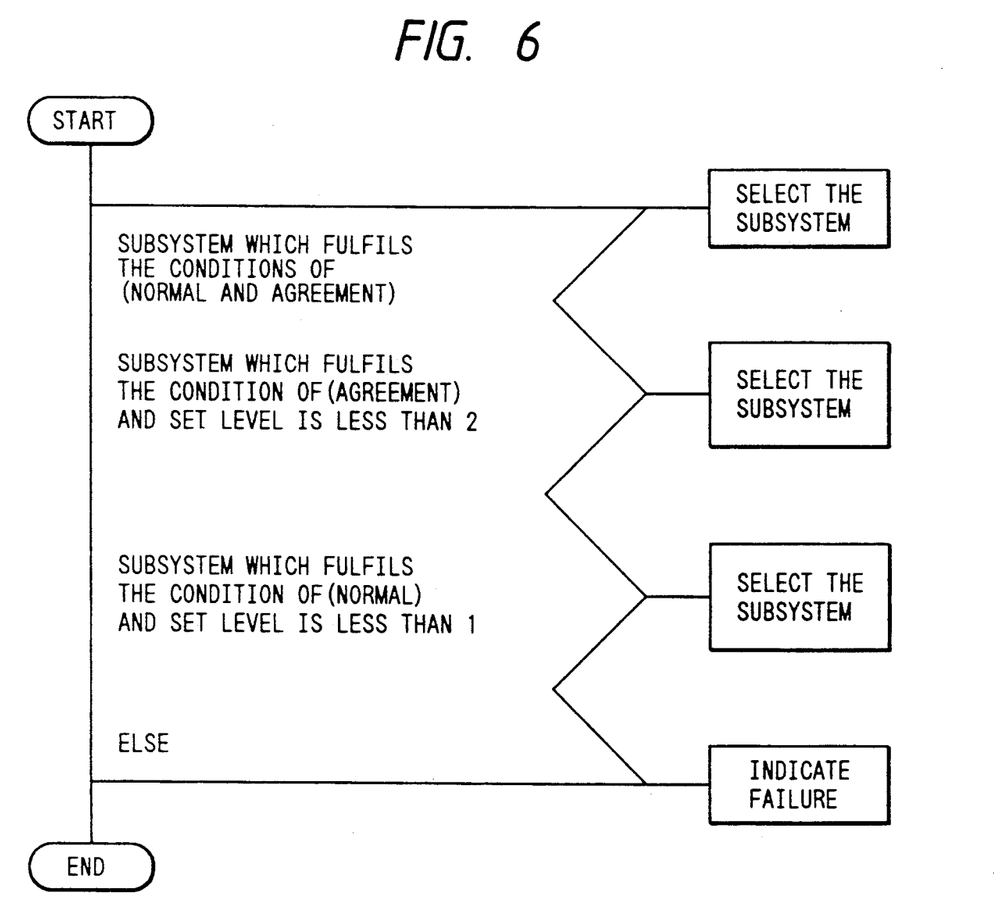
FIG. 6 shows a sixth embodiment of the present invention in the case where the allowable levels of the reliabilities of an output are set.

The desired value of the reliability can be set by a value of level shown in FIG. 6. Not only the survival probability of a system, but also the safety thereof can be maintained in such a way that, when an output satisfying the required level is not obtained, the delivery of the output is suspended, or a signal indicative of a warning is delivered.

Here, the levels express the required levels of the reliabilities, and depending upon the values thereof, the following can be held:

$$2: Rd \geq (1 - P_\epsilon^K \cdot P_{d\epsilon}^K \cdot P_{a\epsilon}^{K-1}) \quad (15)$$

$$1: Rd \geq (1 - P_\epsilon^K \cdot P_{a\epsilon}^{K-1}) \quad (16)$$

$$0: Rd \geq (1 - P_\epsilon^K \cdot P_{d\epsilon}^K) \quad (17)$$

The safety of a controller is necessary for maintaining the fail-safe operation of a controlled object, and it is an especially important function in the fields of applications, such as a traffic control, in which the malfunction of a system endangers human lives or confuses society seriously.

In addition, according to this embodiment, a fault tolerant computer capable of meeting various purposes by the identical system configuration can be constructed by selecting an appropriate level. By way of example, in a computer which is used in a commercial on-line system, enhancement in availability must be primarily considered. In such a case, when the level stated before in the formula (15) is set at 0, the highest availability can be attained though the lowest limit level of the reliability of an output decreases. In contrast, in a computer which is used for the flight control of an airplane or the like, the reliability of an output must be primarily considered. In such a case, the level stated earlier in the formula (16) is set at 2, whereby a highest output reliability can be attained. In this manner, according to this embodiment, the compatibility between the availability and the output reliability or the trade-off there-between having hitherto been difficult becomes very easy.

Besides, in some uses of computers, a level of a required reliability needs to be changed during an operation. In, for example, the flight control of an airplane, appropriate levels are set in several stages of flights, whereby the safety of occupants can be guaranteed. Let's consider the takeoff of an airplane. The level stated before is set at "2" until a velocity of V1 is exceeded, whereby when the computer has any trifling trouble, the takeoff can be immediately suspended. After the velocity of V1 has been exceeded, the level stated before is set at "1" or "0", whereby the airplane can continue its acceleration to take off and thereafter make a landing.

Hardware Configuration

Figure 7:
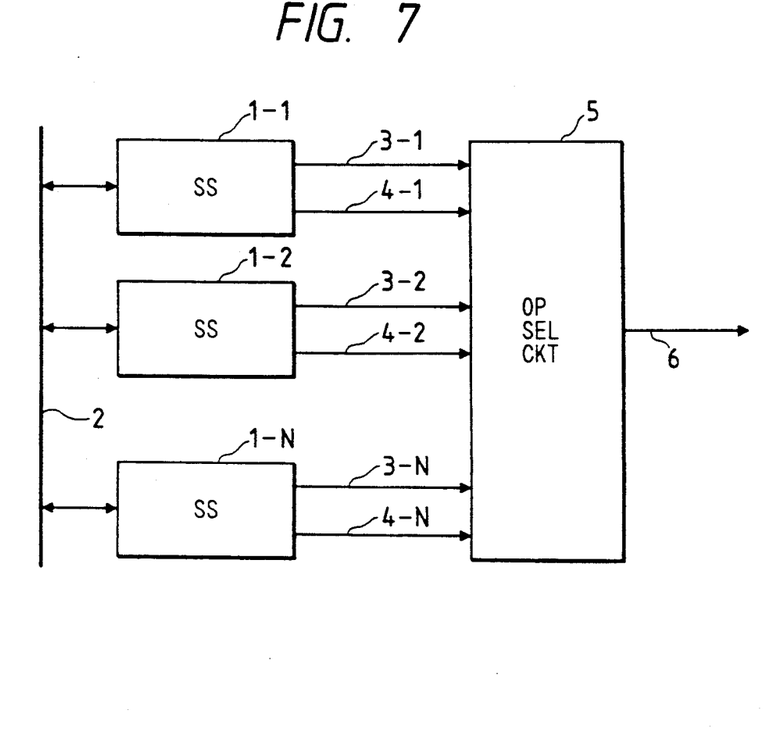
FIG. 7 shows an example of hardware for performing the present invention.

FIG. 7 shows an example of hardware for performing the present invention.

The complicated decisions of the conditions as stated above are needed for performing the present invention. In a computer system, therefore, the condition decisions (cross-diagnoses) should preferably be made by software, and they should preferably be made by redundant subsystems 1-1-1-N in order to multiplex them. Information items, such as the results of the self-diagnoses and processed results necessary for the cross-diagnoses, are exchanged via a communications line 2 which connects the subsystems. In a case where the single final output of the system needs to be determined, an output selection circuit 5 may lastly select the final output 6 from among outputs 3-1-3-N by means of hardware, using cross-diagnostic results (information items indicating whether the respective subsystems are normal or abnormal) 4-1-4-N based on the condition decisions made by the software.

Figure 8:
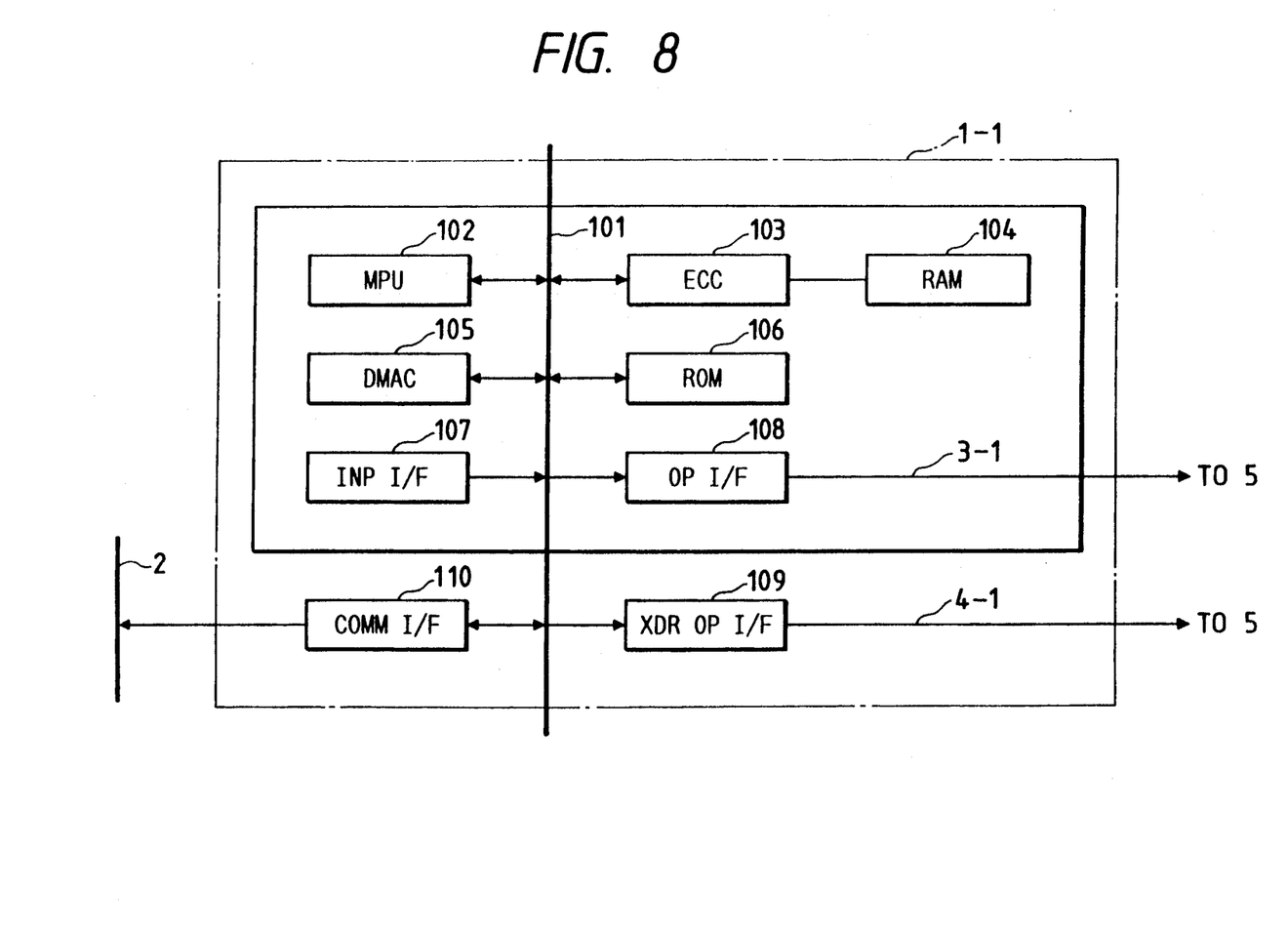
FIG. 8 illustrates a block diagram of a subsystem of the present invention.

FIG. 8 shows an example of the configuration of each individual subsystem. A subsystem 1-1 can be configured in such a way that a computer which is constituted by a bus 101, an MPU (Micro Processing Unit) 102, an ECC encoder/decoder 103, a RAM (Random Access Memory) 104, a DMAC (Direct Memory Access Controller) 105, a ROM (Read Only Memory) 106, an input interface 107 and an output interface 108 is additionally provided with a cross-diagnostic result output interface 109 and an intersubsystem communications interface 110.

Figure 9:
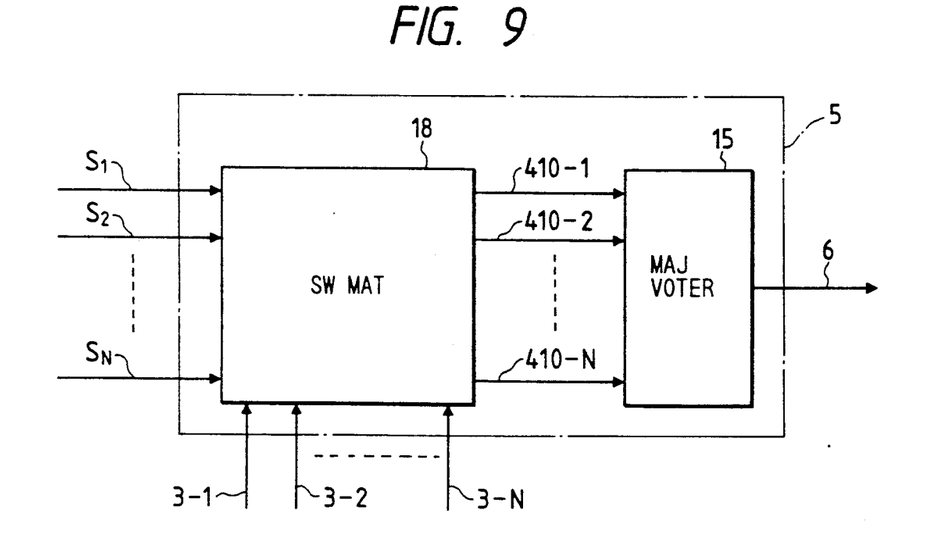
FIG. 9 illustrates a output selecting circuit of the present invention.

The output selection circuit 5 may conform to an MV (Modified Voter) the block diagram of which is shown in FIG. 9.

Table 1 exemplifies a logic table of a switch matrix which is on the upstream side of a majority voter having three inputs for constructing the MV in the case where the number of the subsystems is 4. In this table, S1–S4 denote decided results (information items indicating whether the subsystems 1-1-1-4 are normal or abnormal) S1–S4 for the subsystems 1-1-1-4, and 3-1-3-4 denote outputs from the subsystems 1-1-1-4. F.S. denotes a fail safe signal ("all 0" or "all 1"), and * denotes "don't care".

In a case where all the subsystems 1-1-1-3 are decided normal, namely in a case where all $S_1$–$S_3$ are 1, a majority voter 15 with three inputs is supplied with the outputs 3-1-3-3 of the subsystems 1-1-1-3, and it performs the same operation as the ordinary decision by majority. In a case where one of the subsystems 1-1-1-3 has fallen into a fault status, the output 3-4 of the subsystem 1-4 is applied to the majority voter instead of the output of the faulty subsystem. For instance, in a case where the subsystem 1-1 has fallen into a fault status ($S_1=0$, $S_2$–$S_4=1$), the output 3-4 of the subsystem 1-4 is input to the majority voter instead of the output 3-1 of the subsystem 1-1. In a case where, in accordance with the switch matrix, only one subsystem is normal with the others being abnormal, the majority voter has all its input terminals supplied with the outputs of the normal subsystem, and it delivers the same signal as the outputs of the subsystem.

In a case where the MV is used for triple redundant systems, the decided result S4 of the subsystem 1-4 should be made a fault, namely, "0". In this case, the logic table of the switch matrix is shown by Table 2. In a case where all the subsystems 1-1-1-3 are decided normal, the majority voter 15 is supplied with the outputs 3-1-3-3 of the subsystems 1-1-1-3, and it performs the same operation as the conventional majority voting. In a case where only one subsystem is normal with the others being abnormal, the majority voter is supplied with the output of the normal subsystem as in the case of the quadruple multiplexing, and it delivers the same signal as the output of the subsystem.

In a case where the MV is used for double redundant systems, the decided results S3 and S4 of the subsystems 1-3 and 1-4 should be made faults, namely, "0's". In this case, the logic table of the switch matrix is shown by Table 3. In a case where both the subsystems 1-1 and 1-2 are decided normal, the result of a majority decision among 3-1, 3-2 and F.S. is obtained as the output of the majority voter. Herein, in case of 3-1=3-2, the output of 3-1 (=3-2) is obtained. Besides, in a case of 3-1 ≠3-2, the signal of —all-1's" or "all-0's", namely, F.S. is obtained as the output of the majority voter 15 for the reasons that 3-1 and 3-2 are either "1" or "0" and that F.S. is either "all-1's" or "all-0's". In a case where one of the subsystems 1-1 and 1-2 is decided normal, the majority voter has all its terminals supplied with the output of the subsystem decided normal, and it delivers the output of the subsystem decided normal.

TABLE 1

| S1 | S2 | S3 | S4 | Selection Data | | |
|----|----|----|----|----|----|----|
| 1 | 1 | 1 | * | 3-1 | 3-2 | 3-3 |
| 1 | 1 | 0 | 1 | 3-1 | 3-2 | 3-4 |
| 1 | 0 | 1 | 1 | 3-1 | 3-4 | 3-3 |
| 0 | 1 | 1 | 1 | 3-4 | 3-2 | 3-3 |
| 1 | 1 | 0 | 0 | 3-1 | 3-2 | F.S. |
| 1 | 0 | 1 | 0 | 3-1 | F.S. | 3-3 |
| 1 | 0 | 0 | 1 | 3-1 | 3-2 | F.S. |
| 0 | 1 | 1 | 0 | F.S. | 3-2 | 3-3 |
| 0 | 1 | 0 | 1 | 3-4 | 3-2 | F.S. |
| 0 | 0 | 1 | 1 | 3-4 | F.S. | 3-3 |
| 1 | 0 | 0 | 0 | 3-1 | 3-1 | 3-1 |
| 0 | 1 | 0 | 0 | 3-2 | 3-2 | 3-2 |

TABLE 1-continued

| S1 | S2 | S3 | S4 | Selection Data | | |
|----|----|----|----|----|----|----|
| 0 | 0 | 1 | 0 | 3-3 | 3-3 | 3-3 |
| 0 | 0 | 0 | 1 | 3-4 | 3-4 | 3-4 |
| 0 | 0 | 0 | 0 | F.S. | F.S. | F.S. |

TABLE 2

| S1 | S2 | S3 | Selection Data | | |
|----|----|----|----|----|----|
| 1 | 1 | 1 | 3-1 | 3-2 | 3-3 |
| 1 | 1 | 0 | 3-1 | 3-2 | F.S. |
| 1 | 0 | 1 | 3-1 | F.S. | 3-3 |
| 0 | 1 | 1 | F.S. | 3-2 | 3-3 |
| 1 | 0 | 0 | 3-1 | 3-1 | 3-1 |
| 0 | 1 | 0 | 3-2 | 3-2 | 3-2 |
| 0 | 0 | 1 | 3-2 | 3-3 | 3-3 |
| 0 | 0 | 0 | F.S. | F.S. | F.S. |

TABLE 3

| S1 | S2 | Selection Data | | |
|----|----|----|----|----|
| 1 | 1 | 3-1 | 3-2 | F.S. |
| 1 | 0 | 3-1 | 3-1 | 3-1 |
| 0 | 1 | 3-2 | 3-2 | 3-2 |
| 0 | 0 | F.S. | F.S. | F.S. |

Referring to FIG. 10, data processed signals at the data processing circuits 200-1–200-N are exchanged between the subsystems 1-1-1-N via the communication lines 2 and used at the data comparison circuits 201-1–201-N (not shown). The output signals 203-1–203-N of the self-diagnosis circuits 202-1–202-N are also exchanged among the subsystems. The deciding circuits 204-1–204-N (not shown) of the subsystems 1-1-1-N determine the results 4-1–4-N of the cross-diagnoses which indicate the outputs of subsystems to be selected by the method of the present invention on the basis of the results of the data comparisons 201-1–201-N and the exchanged self-diagnoses 203-1–203-N. The selecting circuits 205-1–205-N (not shown) select the output signals 3-1–3-N (not shown) of each subsystem.

The output selecting circuit 5 selects the final output signal 6 among the output signals 3-1–3-N of the subsystems based on the results 4-1–4-N of the cross-diagnoses.

If there is a mistake in design or manufacture of the subsystems 1-1-1-N, the output signals of the data processing circuits 200-1–200-N has some errors. In this case, erroneous data processing signals coincide with each other causing erroneous output from the output selecting circuit 5. For preventing these drawback, the design or manufacture of the subsystems has to be made in design diversity.

The method of the design diversity is as follows:

1. The hardware of each of the subsystems 1-1-1-N is designed or manufactured in a different method;

2. The data processing circuits 200-1–200-N, the data comparison circuits 201-1–201-N, the deciding circuits 204-1–204-N, or the selecting circuits 205-1–205-N are designed or manufactured, respectively.

The method of above-mentioned 2 is called N-Version Programming. The N-Version Programming is carried out by a set of programs written in different languages for each version to enhance the independency between the versions.

The decided results 400-1–400-N are prepared by one of:

1. a method in which they are produced from the cross-diagnostic results 4-1-4-N by a decision circuit 5 explained in FIG. 9 and the Tables 1-3;

2. a method in which, out of the cross-diagnostic results 4-1-4-N of the subsystems 1-1-1-N, those of appropriate subsystems are respectively retrieved and used as the decided results $S_1$-$S_N$; and so on.

Figure 11:
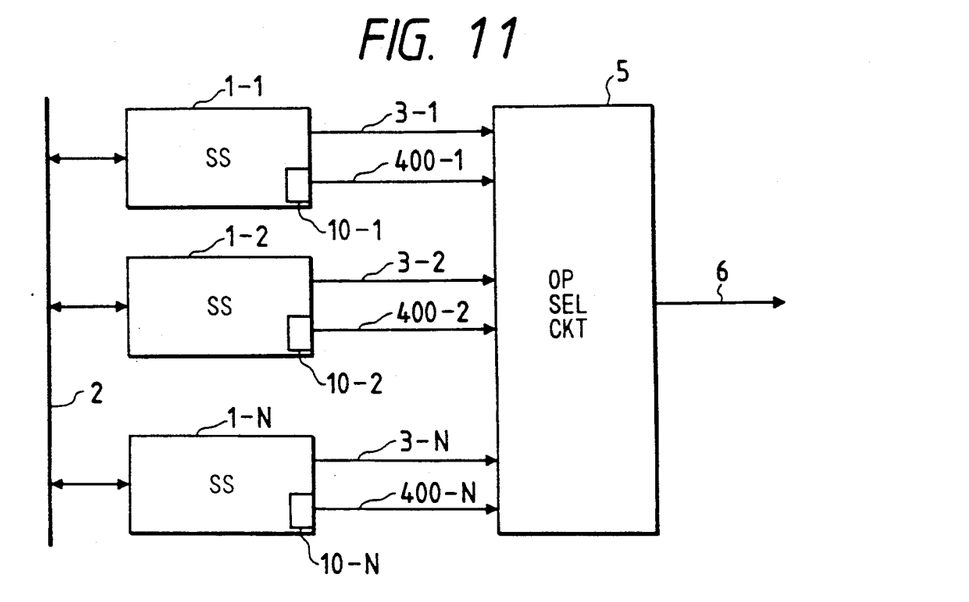
FIG. 11 shows an embodiment of hardware for performing the present invention.

Further, in the method 2, in order to prevent erroneous decided results $S_1$-$S_N$ from being delivered due to the runaway of a microprocessor or the like, the output interfaces 10-1-10-N of the decided results $S_1$-$S_N$ of the respective subsystems may be provided with key codes as illustrated in FIG. 11, thereby making it necessary to write specified key code data in order for the decided results $S_1$-$S_N$ to be normal.

Besides, as disclosed in FIG. 9, the MV and the decision circuits are multiplexed, and the outputs thereof are combined by the majority decision circuits, whereby the lowering of reliability attributed to the complicated circuit arrangements of the MV and the decision circuit can be prevented, and a system of still higher reliability can be provided.

Figure 12:
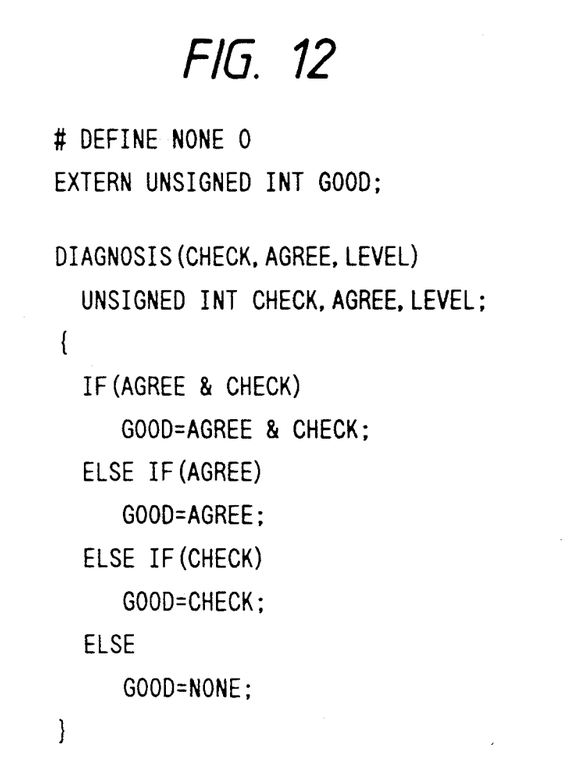
FIG. 12 shows an example of coding based on the C-language.
Figure 13:
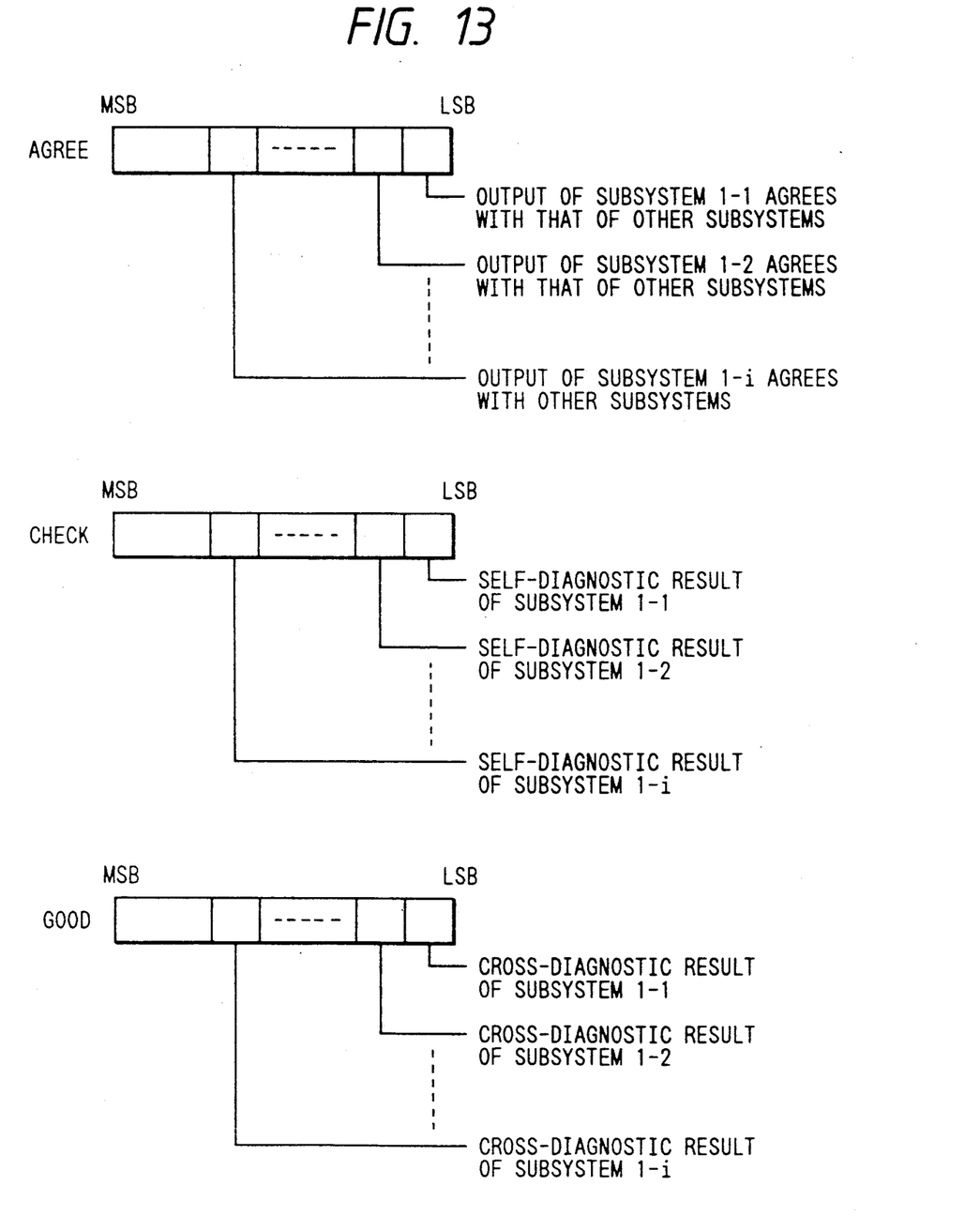
FIG. 13 is a diagram showing examples of data formats.

FIG. 12 exemplifies the program for processing by a computer based on the C-language. "Agree" expresses the agreement/disagreement of output data at the data comparison circuits 201-1-201-N, "check" the normality/abnormality of the results of the self-diagnoses, and "good" the cross-diagnostic results 4-1-4-N. With each bit of the data items "agree", "check" and "good" denoting the normality/abnormality of respective subsystems as shown in FIG. 13, so as to indicate a H level for the normal subsystem and a L level for the abnormal subsystem. For instance, in a case where the data of the subsystem 1-1 does not coincide with the data of other subsystems 1-2-1-N and the data of other subsystems 1-2-1-N coincide each other, the one bit from the LSB side of the variable "agree" becomes L(0) level and other bits become H(1) level. In a case where only the subsystem 1-1 is judged abnormal by the self-diagnoses, the one bit from the LSB side of the variable check becomes L(0) level and other bits becomes H(1) level.

By deciding the structures of the variables of agree and check as mentioned above, the necessary judgment for obtaining the results of the cross-diagnoses 4-1-4-N, namely the variable good can be made by the logical operations of the respective bits in the variables of agree and check so shown in FIG. 13. According to this embodiment, by appropriately type-declaring the variables "agree", "check" and "good", systems of any desired degrees of multiplexing can be coped with by the identical algorithm.

According to the present invention, in a case where a large number of subsystems survive, a selection criterion for an output can be rendered severe to obtain the output of high reliability, and in a case where the number of the surviving subsystems has decreased, the selection criterion can be moderated to ensure the survival of the whole system. Besides, in a case where the reliability of the output does not satisfy a required level, a warning is given by way of example, whereby the fault-security of the operation of the system can be ensured.

Further, since any desired degree of redundancy can be readily coped with, the versatility of the design of a fault-tolerant computer system can be enhanced.

What we claim is:

1. A fault tolerant system in which input signals are supplied to a plurality of redundant subsystems and output signals from the subsystems are supplied to an output selecting circuit after a self-diagnosis and a data comparison among each subsystem are executed in each subsystem, respectively, and the output selecting circuit outputs a selected signal by a method of majority voting based on output signals from the subsystems, the method of majority voting being characterized by:

selecting at first an output signal having a reliability based on the lowest probability of defective report rate from a subsystem in which abnormality is not detected as a result of the self-diagnosis and whose data comparison with another subsystem results in coincidence;

selecting an output signal of a subsystem which has a second-highest output reliability based on the second-lowest probability of defective report rate in accordance with the self-diagnosis and the data comparison in an absence of a subsystem which is most reliable; and selecting an output signal of a subsystem which has a next lower output reliability based on a higher probability of defective report rate in accordance with the self-diagnosis and the data comparison in an absence of a subsystem which has the second-highest output reliability.

2. A fault tolerant system in which input signals are supplied to a plurality of redundant subsystems and output signals from the subsystems are supplied to an output selecting circuit after a self-diagnosis and a data comparison among each subsystem are executed in each subsystem, respectively, and the output selecting circuit outputs a selected signal by a method of majority voting based on output signals from the subsystems, the method of majority voting being characterized by:

selecting at first a most reliable output signal from a subsystem which is decided as normal as a result of the self-diagnosis and whose data comparison with other subsystems coincides with each other as a result of the data comparison;

selecting an output signal of a subsystem having a second-highest output reliability in which a comparison with other subsystems coincides with each other in an absence of a subsystem of the highest reliability; and selecting an output signal of a subsystem having a third-highest output reliability which is decided as normal as a result of the self-diagnosis in an absence of a subsystem which has the second-highest output reliability.

3. A fault tolerant system in which input signals are supplied to a plurality of redundant subsystems and output signals from the subsystems are supplied to an output selecting circuit after a self-diagnosis and a data comparison among each subsystem are executed in each subsystem, respectively, and the output selecting circuit outputs a selected signal by a method of majority voting based on output signals from the subsystems, the method of majority voting being characterized by:

selecting at first a most reliable output signal from a subsystem which is decided that a bit error is not involved as a result of the self-diagnosis and whose data comparison with other subsystems coincides with each other as a result of the data comparison;

selecting an output signal of a subsystem which has a second-highest output reliability based on judgments that an error of 2 or more bits is not involved as a result of the self-diagnosis and a data comparison with other subsystems coincides with each other as a result of the data comparison in an absence of a subsystem which is most reliable;

selecting an output signal of a subsystem which has a third-highest output reliability based on a judgment that a data comparison with other subsystems coincide with each other as a result of the data comparison in an absence of a subsystem which has the second-highest output reliability;

selecting an output signal of a subsystem which has a fourth-highest output reliability based on a judgment that a bit error is not involved as a result of the self-diagnosis in' an absence of a subsystem which has the third-highest output reliability; and selecting an output signal of a subsystem which has a fifth-highest output reliability based on a judgment that an error of 2 or more bits is not involved as a result of the self-diagnosis in an absence of a subsystem which has the fourth-highest output reliability.

4. A fault tolerant system in which input signals are supplied to a plurality of redundant subsystems and output signals from the subsystems are supplied to an output selecting circuit after a self-diagnosis and a data comparison among each subsystem are executed in each subsystem, respectively, and the output selecting circuit outputs a selected signal by a method of majority voting based on output signals from the subsystems, the method of majority voting being characterized by:

selecting at first a most reliable output signal from a subsystem in which abnormality is not detected as a result of the self-diagnosis and whose data comparison with other subsystems coincides with each other as a result of the data comparison;

selecting an output signal of a subsystem which has a second-highest output reliability based on the self-diagnosis in an absence of a subsystem which is most reliable; and selecting an output signal of a subsystem which has a third-highest output reliability based on a judgment that a data comparison with another subsystems coincides with each other as a result of the data comparison in an absence of a subsystem which has the second-highest output reliability.

5. A fault tolerant system in which input signals are supplied to a plurality of redundant subsystems and output signals from the subsystems are supplied to an output selecting circuit after a self-diagnosis and a data comparison among each subsystem are executed in each subsystem, respectively, and the output selecting circuit outputs a selected signal by a method of majority voting based on output signals from the subsystems, the method of majority voting being characterized by:

selecting at first an output signal having a reliability based on the lowest probability of defective report rate from a subsystem in which abnormality is not detected as a result of the self-diagnosis and whose data comparison with other subsystems coincides with each other as a result of the data comparison;

selecting an output signal of a subsystem which has a second-highest output reliability based on the second-lowest probability of defective report rate and whose reliability is higher than a desired value based on the self-diagnosis and the data comparison in an absence of a subsystem which is most reliable; and selecting an output signal of a subsystem which has a next lower output reliability based on a higher probability of defective report rate and whose probability of defective report rate is lower than a desired value based on the self-diagnosis and the data comparison in an absence of a subsystem which has the second-highest output reliability.

6. A fault tolerant system in which input signals are supplied to a plurality of redundant subsystems and output signals from the subsystems are supplied to an output selecting circuit after a self-diagnosis and a data comparison among each subsystem are executed in each subsystem, respectively, and the output selecting circuit outputs a selected signal by a method of majority voting based on output signals from the subsystems, the method of majority voting being characterized by:

selecting at first a most reliable output signal from a subsystem in which abnormality is not detected as a result of the self-diagnosis and whose data comparison with another subsystem coincides with each other as a result of the data comparison;

selecting an output signal of a subsystem which has a second-highest output reliability based on the self-diagnosis and the data comparison in an absence of a subsystem which is most reliable; and selecting an output signal of a subsystem which has a next lower output reliability based on the self-diagnosis and the data comparison in absence of a subsystem which has the second-highest output reliability, wherein data processes at said subsystems are treated by different programs, respectively, using a N-version program.

7. A fault tolerant system in which input signals are supplied to a plurality of redundant subsystems and output signals from the subsystems are supplied to an output selecting circuit after a self-diagnosis and a data comparison among each subsystem are executed in each subsystem, respectively, said output selecting circuit including means for outputting a selected signal by majority voting based on the output signals from the subsystems so that an output signal is selected form a subsystem having the highest reliability Rd of the following:

(1) $Rd = 1 - P_\epsilon^K \cdot P_{d\epsilon}^K \cdot P_{a\epsilon}^{K-1}$ (2) $Rd = 1 - P_{68}^K \cdot P_{a\epsilon}^{K-1}$ (3) $Rd = 1 - P_\epsilon^K \cdot P_{d\epsilon}^K$ where Pdε is defective report rate, Paε is the probability at which erroneous data items agree, Pε is the probability at which error occurs and K is the number of subsystems determined to be normal.

* * * * *